United States Patent [19]
Coaton

[11] 4,027,189
[45] May 31, 1977

[54] TUNGSTEN HALOGEN LAMP

[75] Inventor: James Richard Coaton, London, England

[73] Assignee: Thorn Electrical Industries Limited, London, England

[22] Filed: Sept. 3, 1975

[21] Appl. No.: 609,974

Related U.S. Application Data

[63] Continuation of Ser. No. 412,034, Nov. 1, 1973, abandoned, which is a continuation of Ser. No. 219,728, Jan. 21, 1972, abandoned.

[52] U.S. Cl. .............................. 313/222; 313/174; 313/223
[51] Int. Cl.² ........................................ H01K 1/50
[58] Field of Search ................... 313/174, 222, 223

[56] References Cited

UNITED STATES PATENTS

| | | | |
|---|---|---|---|
| 1,925,857 | 9/1933 | Van Liempt | 313/222 X |
| 2,882,435 | 4/1959 | Millner et al. | 313/222 |
| 3,240,975 | 3/1966 | English et al. | 313/222 |
| 3,418,512 | 12/1968 | T'Jampens et al. | 313/222 X |
| 3,585,435 | 6/1971 | T'Jampens | 313/174 |
| 3,644,772 | 2/1972 | Yuge | 313/174 |
| 3,712,701 | 1/1973 | Johnston et al. | 313/222 X |

FOREIGN PATENTS OR APPLICATIONS

| | | | |
|---|---|---|---|
| 1,251,433 | 10/1967 | Germany | 313/222 |
| 1,023,850 | 3/1966 | United Kingdom | 313/223 |

*Primary Examiner*—Palmer C. Demeo
*Attorney, Agent, or Firm*—Robert F. O'Connell

[57] ABSTRACT

A linear tungsten halogen lamp which can be burnt at any desired angle is made by selecting the gas filling and the halogen or halogen-containing compound to satisfy certain conditions which can be mathematically expressed. If these conditions are satisfied, the separation of halogen which occurs in conventional linear tungsten halogen lamps when burnt at angles inclined to the horizontal is reduced to an acceptable level. It is found that the maximum degree of separation of the halogen, herein denoted by $\gamma$ max, can be calculated from lamp parameters as a function of the thermal diffusion coefficient of the halogen in the filling, the tube length, the temperature difference between the filament and the tube wall, the average gas temperature, the radius of the coiled filament and the inside radius of the tube.

8 Claims, 1 Drawing Figure

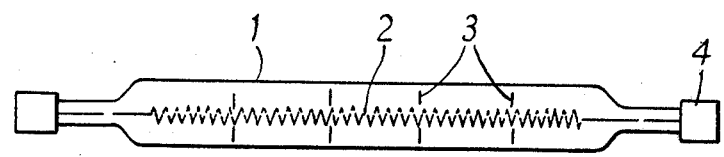

TUNGSTEN HALOGEN LAMP

This is a continuation of application Ser. No. 412,034, filed on Nov. 1, 1973, which is a continuation of application Ser. No. 219,728, filed on Jan. 21, 1972, both now abandoned.

This invention relates to tungsten halogen lamps.

Reference is made herein to co-pending Application Ser. No. 1,404, filed Jan. 8, 1970, and now abandoned, which is assigned to the same assignee as the present application and which discloses an invention which can be used as a preferred modification in the practice of the present invention.

Tungsten halogen lamps commonly have the form of a long tubular light-transmitting envelope, usually of a high silica-content material, with a coiled tungsten filament positioned axially along the centre of the tube by suitable supports. Such a lamp commonly known as a 'linear tungsten halogen'.

It is well known that when the length of these lamps exceeds approximately eight times the envelope diameter, the halogen can separate (i.e. take up a non-uniform distribution in the lamp envelope) if the lamp is tilted by more than a few degrees from the horizontal position. This causes the lamp to have an excess of halogen at the lower end of the envelope and a deficiency at the upper end, which leads to a break-down of the chemical transport cycle and results in bulb blackening in the halogen-deficient region. The mechanism of the halogen separation is complex, depending upon thermal diffusion and mutual diffusion of the halogen in the filling, and the velocity of the gas flow within the envelope, as described by the inventor elsewhere (see Coaton, J. R., and Phillips, N. J., Proc. IEE, 118 (7) pp. 871–974 (1971) Coaton, J. R., and Phillips, N. J., Journal of Physics B, 4, pp. 248–257 (1971))

It has been disclosed in British Pat. No. 1,041,322 that if the gasfilling pressure is increased above a certain critical maximum, separation can be reduced to an acceptable level for vertical operation of linear tungsten iodine lamps. However, such lamps will not operate at every burning angle, and separation of the iodine occurs at certain critical angles.

The single FIGURE is a view of a typical linear tungsten halogen lamp, showing a structure which can be employed in connection with the present invention.

It has now been found that a "universal burning" linear tungsten halogen lamp can be made by selecting the gasfilling and a suitable halogen, or compound containing a halogen, to satisfy certain conditions. The maximum degree of separation of the halogen that can occur at the most unfavourable angle of burning can be denoted by a value $\gamma$ max, which can be estimated from the dimensions and other parameters of the lamp. Experiment has shown that if a lamp is to be universal burning, then the value of $\gamma$ max must be less than a certain numerical value corresponding to the maximum permissible degree of halogen separation. The numerical value of $\gamma$ max can be calculated from:

$$\gamma\text{max} = \frac{\alpha \, l \Delta T}{4 \sqrt{2} w \, \overline{T}}$$

where $\alpha$ = thermal diffusion factor of the gas and halogen in the filling

L = active length of lamp (lit length) (mm)

$\Delta T$ = temperature difference from filament to bulb wall (°K)

$\overline{T}$ = average gas temperature (°K)

$\omega = (r_2 - r_1)/2$ $r_1$ = radius of coiled filament (mm)

$r_2$ = inside of radius of bulb (mm)

The drawing shows a typical linear tungsten halogen lamp structure including a tubular envelope 1, coiled filament 2, filament supports 3 and end connectors 4, which can be employed in lamps according to this invention by selecting the design parameters to conform to the requirement hereinbefore set forth. The structural details and method of fabrication of the lamp are conventional and are well understood by those skilled in the art.

TABLE 1

Calculated values of thermal diffusion factor at an average gas temperature of 2000K, assuming only a trace of halogen in the gas-filling.

| Gas | Halogen | Thermal Diffusion Factor |
|---|---|---|
| Ar | $I_2$ | − 0.450 |
| Kr | $I_2$ | − 0.310 |
| Xe | $I_2$ | − 0.195 |
| Ar | $Br_2$ | − 0.377 |
| Kr | $Br_2$ | − 0.198 |
| Xe | $Br_2$ | − 0.066 |
| Ar | $Cl_2$ | − 0.1775 |
| Kr | $Cl_2$ | − 0.0422 |
| Xe | $Cl_2$ | + 0.1566 |

Note:
− sign indicates that halogen will move down the lamp
+ sign indicates that halogen will move up the lamp.

In selecting the value of $\gamma$ max, the maximum tolerable degree of separation of halogen must be decided, and Table 2 gives typical values of change in halogen concentration at the upper end of a linear lamp burning at an angle to the horizontal corresponding to a series of values of $\gamma$ max.

TABLE 2

This shows the change in halogen concentration at the upper end of a linear tungsten halogen lamp burning at the least favourable angle, for various values of $\gamma$ max. The concentration is calculated in relative terms, a value of 1.0 corresponding to uniform distribution of halogen in the lamp (as when the lamp burns horizontally).

| $\gamma$max | Halogen Concentration |
|---|---|
| 0 | 1.00 |
| 0.5 | 0.81 |
| 1.0 | 0.65 |
| 1.5 | 0.51 |
| 2.0 | 0.39 |
| 2.5 | 0.29 |
| 3.0 | 0.22 |
| 3.5 | 0.16 |
| 4.0 | 0.12 |

In general, a lower limit of 0.65 of the halogen concentration corresponding to uniform distribution is satisfactory in the majority of cases using elemental halogen, and this gives a value of $\gamma$ max $\leq 1.0$. However, in certain cases this may be exceeded as will be further explained.

The factors L, $\Delta T$, $\overline{T}$ and $\omega$ are not easily varied, but by choosing different gas-filling/halogen mixtures $\alpha$ can be changed, and Table 1 gives calculated values of $\alpha$ for various combinations. For $\gamma$ max to be small, $\gamma$ must approach zero, and the best combinations are therefore Xe/Br$_2$ ($\alpha$ = 0.066) and Kr/Cl$_2$ ($\alpha$ = 0.042); in many practical lamps these give values of $\gamma$ max < 1.

The major disadvantage in using Br$_2$ or Cl$_2$ is that quantity is extremely difficult to control. Any excess causes erosion of the solid tungsten supports and filaments, while a deficiency gives bulb blackening. This implies that the permissible change in concentration of the halogen must be within closer limits than those imposed by considerations of halogen separation.

Hydrogen bromide is often used to control the effect of excess bromine, but when a linear lamp is operated at an angle the hydrogen tends to concentrate at the upper end, reducing the transport cycle activity and leading to bulb blackening. Also, in long life lamps of more than 1000 h life, the hydrogen diffuses out of the fused quartz envelope, and an excess of bromine results, later in life.

Another form of control is to employ alkyl halides such as, in the case of bromine, methyl bromide or methylene bromide. This also relies on hydrogen bromide as the controlling species, and is subject to the same disadvantage, namely the loss of hydrogen by diffusion over a long lamp life.

This difficulty can be overcome by using bromophosphonitrile, chlorophosphonitrile or mixtures thereof as a source of halogen, as described in our copending Patent Application Ser. No. 1,404. In this case the phosphorus controls the amount of free halogen in the lamp and prevents erosion at the lower end of the lamp, where a slight excess of halogen is present, and gives a truely universal burning lamp. When a halophosphonitrile is used as the source of halogen, or where another compound is used which releases halogen in lamp operation and which so provides for the storage of excess halogen in an available but harmless way, such as hydrogen bromide or the alkyl bromides mentioned above, the value of $\gamma$ max may be increased to 1.6, whilst still giving an acceptable universal burning lamp.

The following are three examples of universal burning linear tungsten halogen lamps in accordance with the invention, using the halogen in the form of a halophosphonitrile, so that $\gamma$ max $\leq$ 1.6.

EXAMPLE 1

A 240 V 1500W linear lamp of conventional construction with the following characteristics
L = 175mm,
$\Delta$T = 2200K,
$\overline{T}$ = 1900K,
W = 1.65
is gas-filled with 2 atmospheres of xenon and bromine in the form of 90 $\mu$g of bromophosphonitrile.
In this case $$\gamma\text{max} = \frac{0.066 \times 175 \times 2200}{5.656 \times 1.65 \times 1900} = \underline{1.44}$$

and this lamp is universal burning up to a life of 2000h.

EXAMPLE 2

As a less expensive alternative to xenon gas-filling, a lamp of similar construction can be made to operate at any angle, without erosion of the filament, filament tail or supports and without bulb blackening, by filling with 2 atmospheres of krypton and 50 $\mu$g of chlorophosphonitrile, as described in application Ser. No. 1,404. In this case $$\gamma\text{max} = \frac{0.042 \times 125 \times 2200}{5.656 \times 1.65 \times 1900} \underline{0.92}$$

EXAMPLE 3

A 240V 1000W photographic lamp of conventional construction with the following characteristics
L = 65 mm,
$\Delta$T = 2300K,
$\overline{T}$ = 2050K,
W = 1.65
is filled with 2.5 atmospheres of krypton and 50 $\mu$g of bromophosphonitrile.
In this case $$\gamma\text{max} = \frac{0.198 \times 65 \times 2300}{5.656 \times 1.65 \times 2000} = \underline{1.55}$$

This is a borderline case, but it is feasible because the designed lamp life is only 15h.

I claim:
1. A linear tungsten halogen lamp comprising
   a tubular light-transmitting bulb having an internal length L and an inside radius $r_2$ the value of L being equal to, or greater than, about 16$r_2$;
   a coiled filament in said bulb having a radius $r_1$, extending axially along said tube, the value of $r_2$ being greater than the value of $r_1$ and the temperature difference from said filament to the wall of said bulb being $\Delta$T;
   leads for supplying said filament with electrical power; and
   a gas filling having an average gas temperature of T in said bulb, said gas filling including halogen having a preselected thermal diffusion coefficient $\Delta$, said halogen, said length L, said radius $r_2$, and said radius $r_1$, all being selected so that the magnitude of the quantity

$$\frac{\alpha L \Delta T}{2\sqrt{2}\ (r_2 - r_1)\overline{T}}$$

is equal to or greater than zero and is not greater than 1.0 wherein said halogen is in substantially elemental form.

2. A lamp according to claim 1 wherein said halogen is bromine.

3. A lamp according to claim 1 wherein said halogen is chlorine.

4. A lamp according to claim 1 wherein said gas filling comprises xenon or krypton.

5. A linear tungsten halogen lamp comprising
   a tubular light-transmitting bulb having an internal length L and an inside radius $r_2$ the value of L being equal to, or greater than, about 16$r_2$;
   a coiled filament in said bulb having a radius $r_1$, extending axially along said tube, the value of $r_2$ being greater than the value of $r_1$ and the temperature difference from said filament to the wall of said bulb being $\Delta$T;
   leads for supplying said filament with electrical power; and
   a gas filling having an average gas temperature of T in said bulb, said gas filling including halogen having a preselected thermal diffusion coefficient $\alpha$, said halogen, said length L, said radius $r_2$, and said radius $r_1$, all being selected so that the magnitude of the quantity $$\frac{\alpha L \Delta T}{2\sqrt{2}\,(r_2-r_1)\overline{T}}$$

is equal to or greater than zero and is not greater than 1.6 wherein said halogen is in the form of a halogen compound which releases halogen in lamp operation.

6. A lamp according to claim 2 wherein said halogen compound is bromophosphonitrile.

7. A lamp according to claim 2 wherein said halogen compound is chlorophosphonitrile.

8. A lamp according to claim 5 wherein said gas filling comprises xenon or krypton.

* * * * *